May 27, 1958 W. B. LYON 2,836,303
ARTICLE STORAGE AND DISPLAYING MECHANISM
Filed March 1, 1955 6 Sheets-Sheet 3

INVENTOR.
William B Lyon
BY
ATTORNEY.

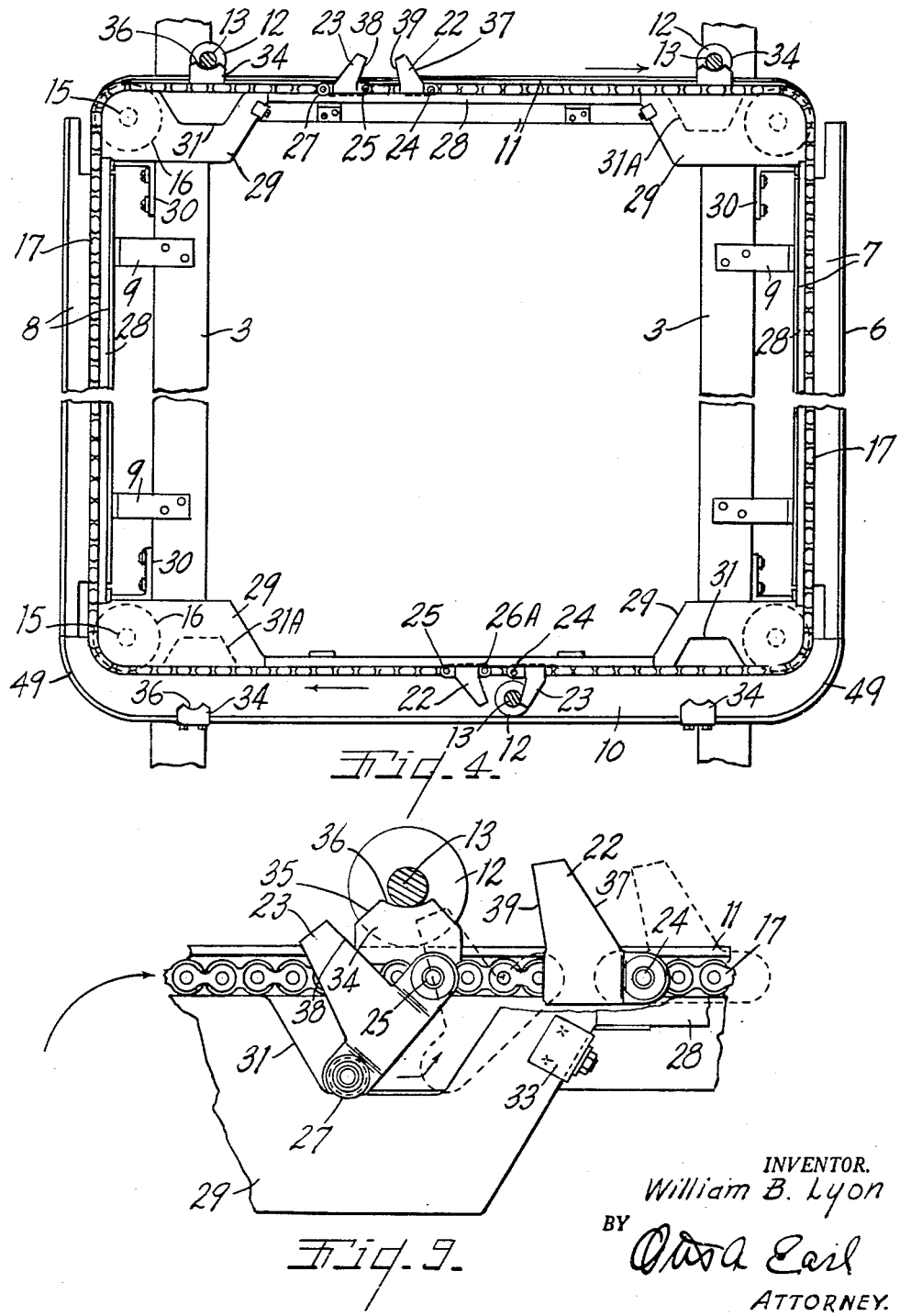

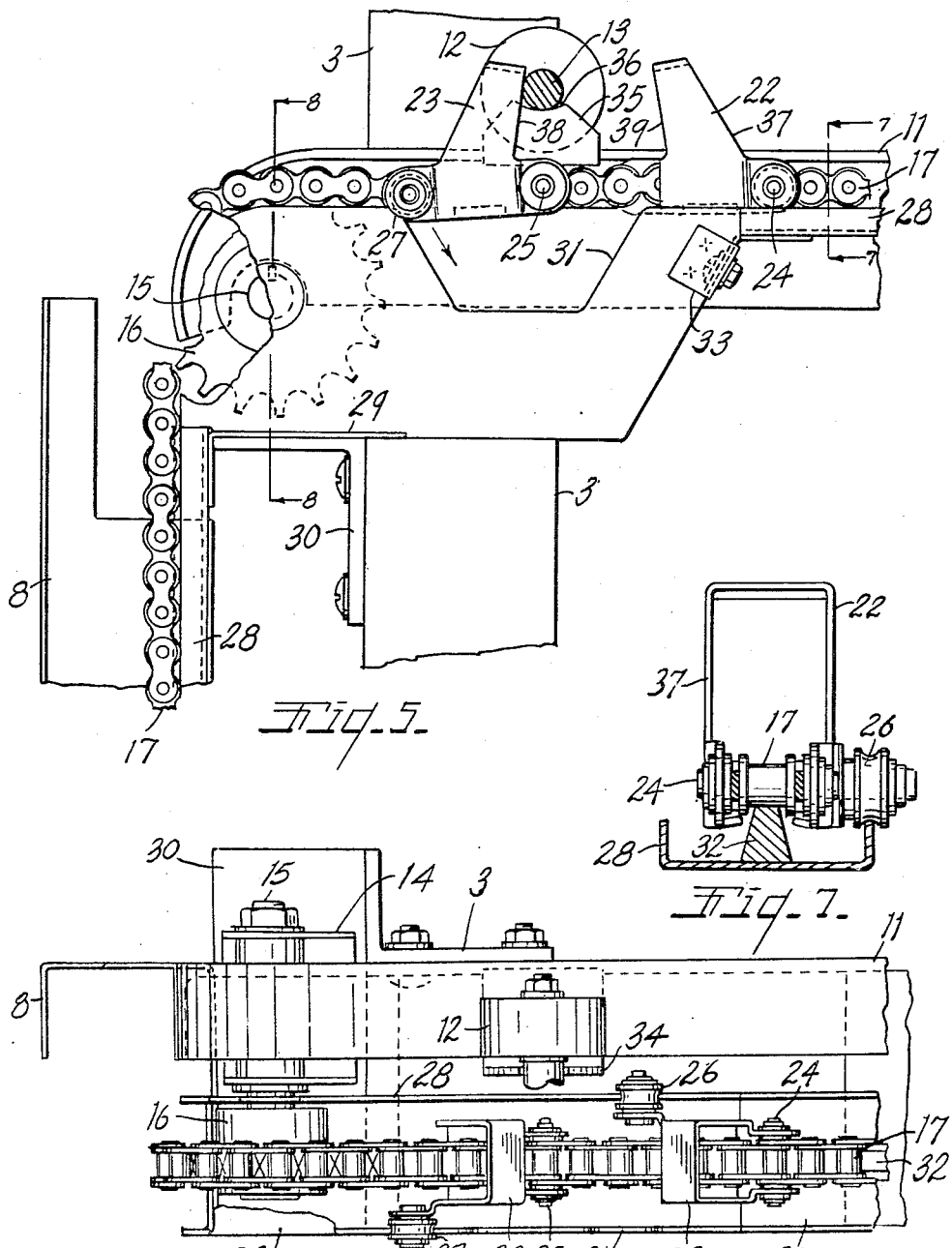

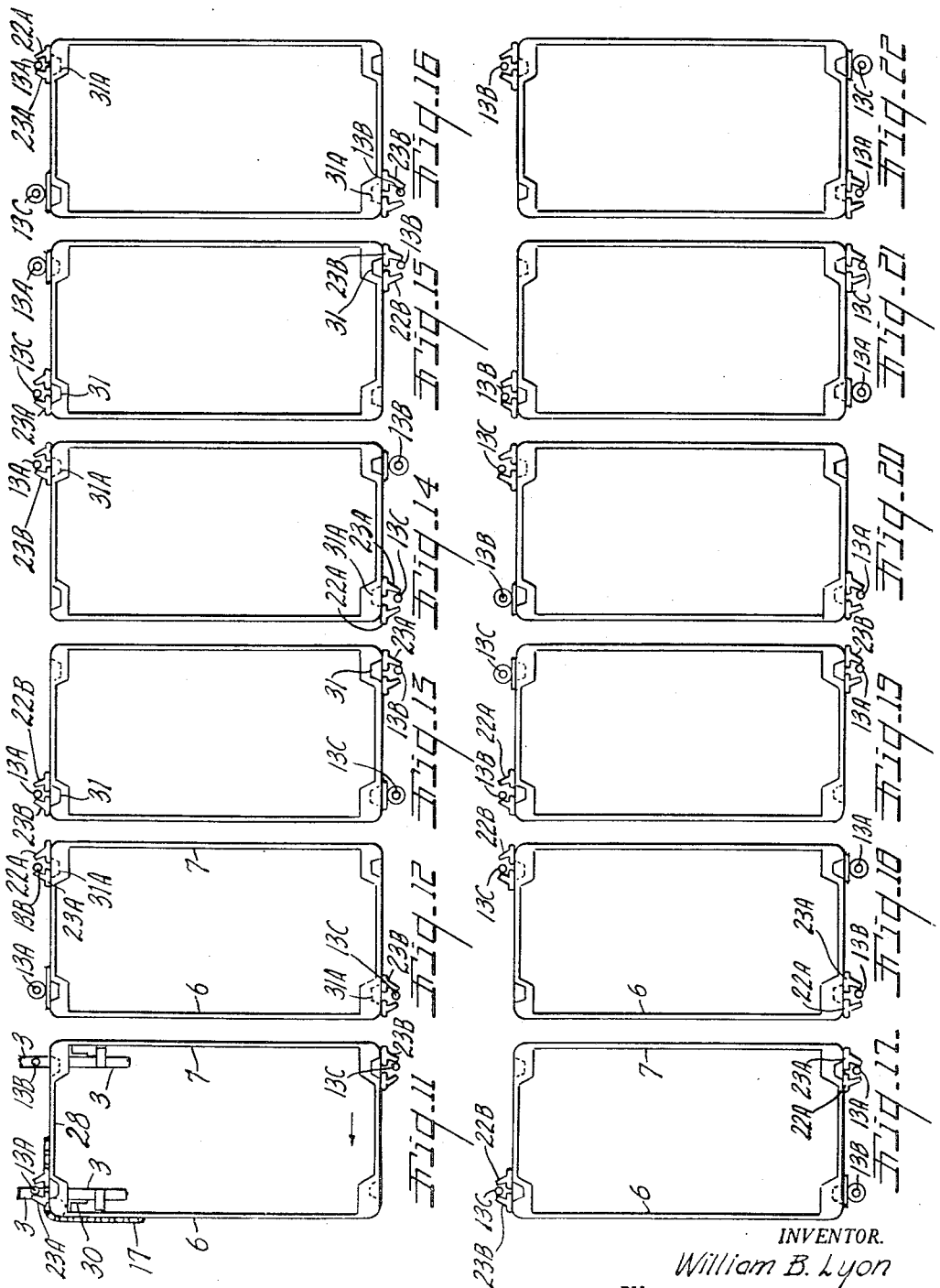

United States Patent Office
2,836,303
Patented May 27, 1958

2,836,303
ARTICLE STORAGE AND DISPLAYING MECHANISM

William B. Lyon, Kalamazoo, Mich.

Application March 1, 1955, Serial No. 491,484

13 Claims. (Cl. 211—1.5)

This invention relates to improvements in article storage and displaying mechanism.

The principal objects of this invention are:

First, to provide a supporting and conveying mechanism for successively advancing a series of articles to a display or access position from a storage position, which apparatus occupies a minimum of space.

Second, to provide an article storing and display mechanism that is extremely simple in operation and relatively inexpensive to construct.

Third, to provide a conveyor system for successively advancing a series of article supports between display and storage positions, which conveying mechanism has support advancing pawls that are secured to the conveyor by simple pivots and regulated for movement between operative and inoperative position by fixed cam plates so that moving parts of the apparatus are reduced to a minimum.

Other objects and advantages of the invention will be apparent from a consideration of the following description and claims.

The drawings, of which there are six sheets, illustrate a highly practical form of the invention.

Fig. 4 is an enlarged fragmentary elevational view from the inside of one side of the article advancing and supporting mechanism.

Fig. 5 is a further enlarged fragmentary elevational view of the upper left corner of the support and conveyor illustrated in Fig. 4.

Fig. 6 is a fragmentary plan view of the structure shown in Fig. 5.

Fig. 7 is a fragmentary cross sectional view through the article advancing conveyor taken along the plane of the line 7—7 in Fig. 5.

Fig. 9 is an enlarged fragmentary elevational view of the structure shown in Fig. 5 with the article advancing conveyor in a different operative position.

Fig. 10 is an enlarged fragmentary inside elevational view of the upper right-hand corner of the article advancing mechanism, as illustrated in Figs. 2 and 4.

Figs. 11 to 22 are conventional illustrations of the article advancing conveyor in successively advancing positions.

The present invention constitutes an improvement on similar structures disclosed and claimed in my patents, 2,513,502; 2,636,799; 2,659,647 and 2,637,780.

Figure 1:
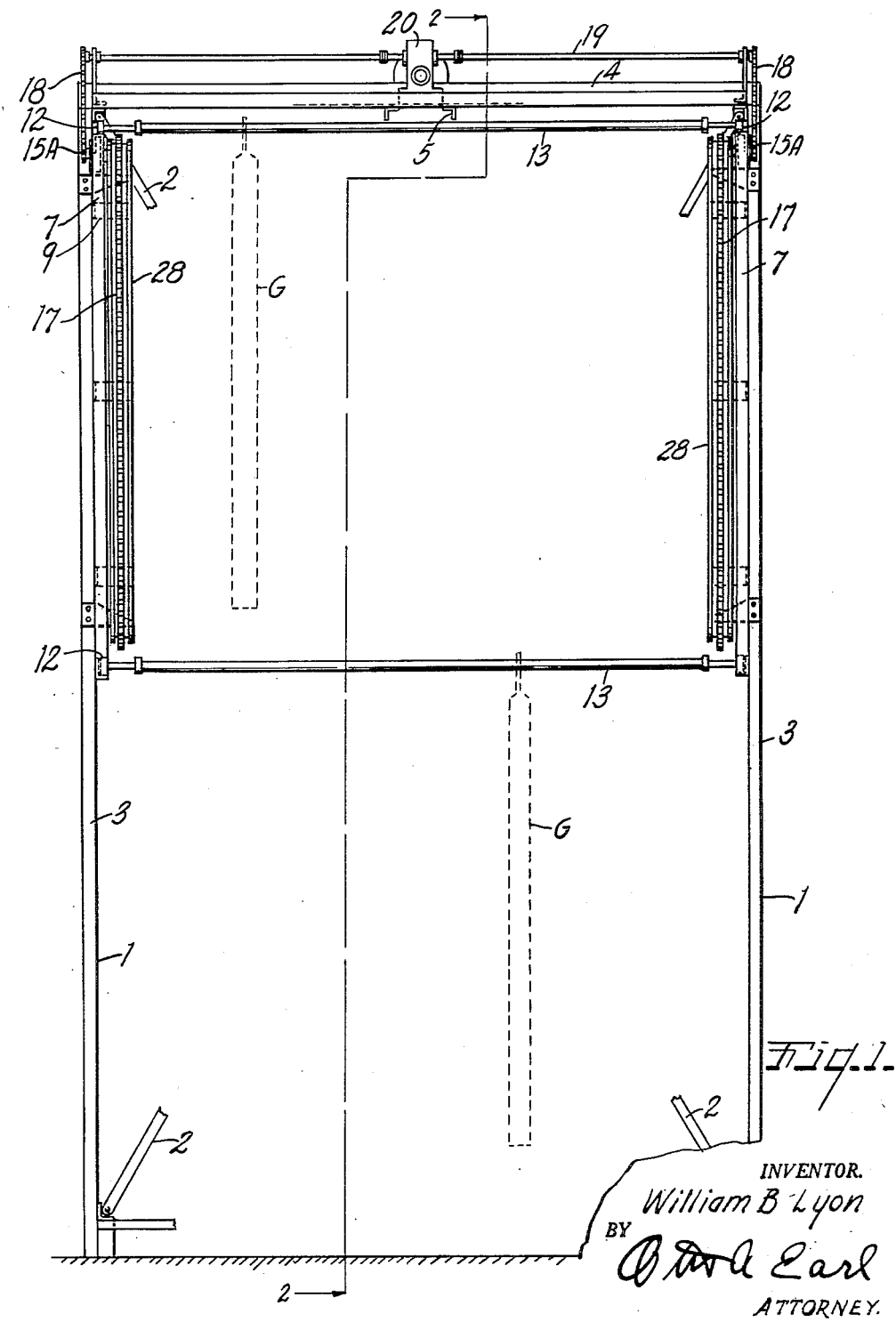
Fig. 1 is a fragmentary front elevational view of the article storage and display apparatus.
Figure 2:
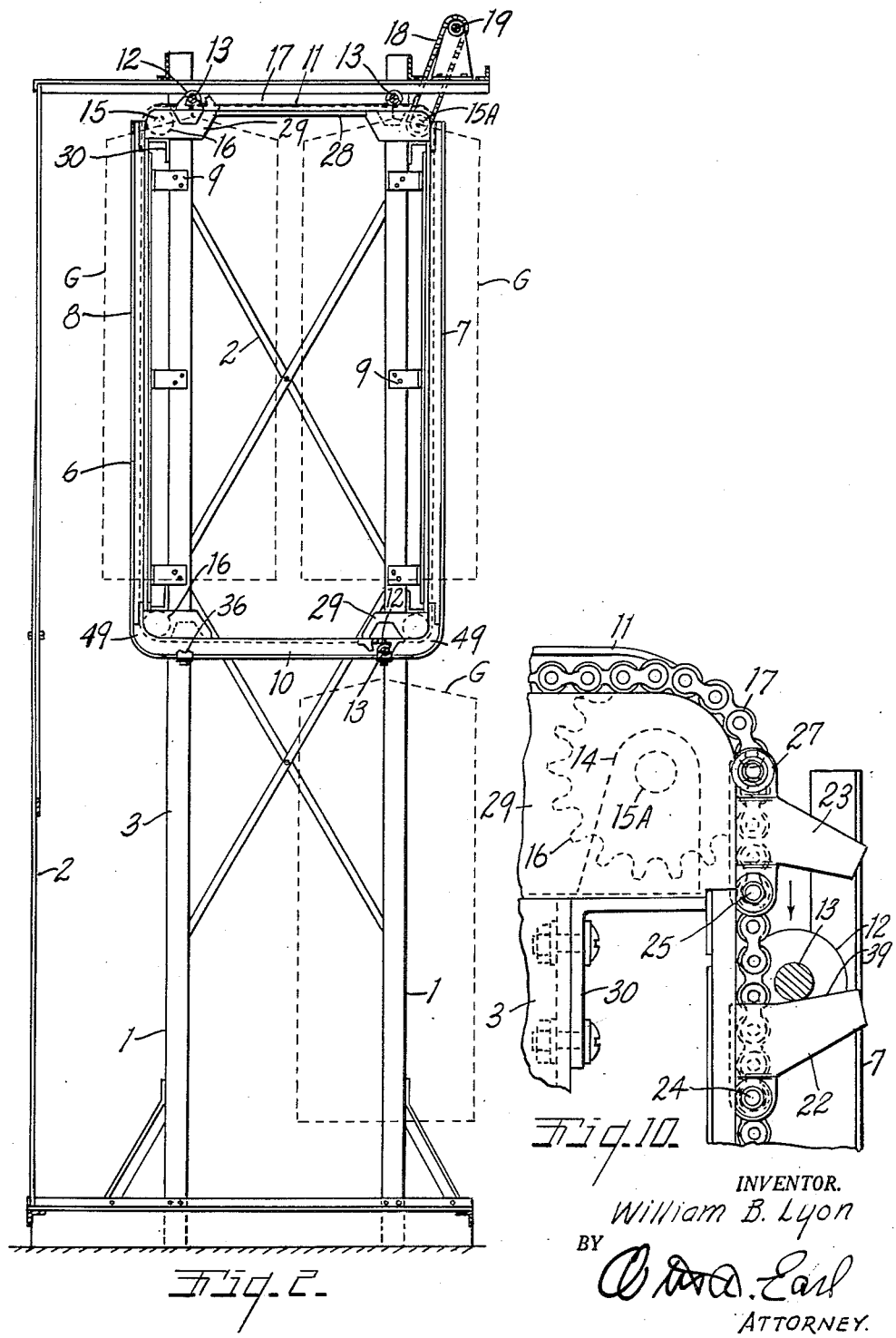
Fig. 2 is a transverse cross sectional view through the apparatus taken along the plane of the line 2—2 in Fig. 1.
Figure 3:
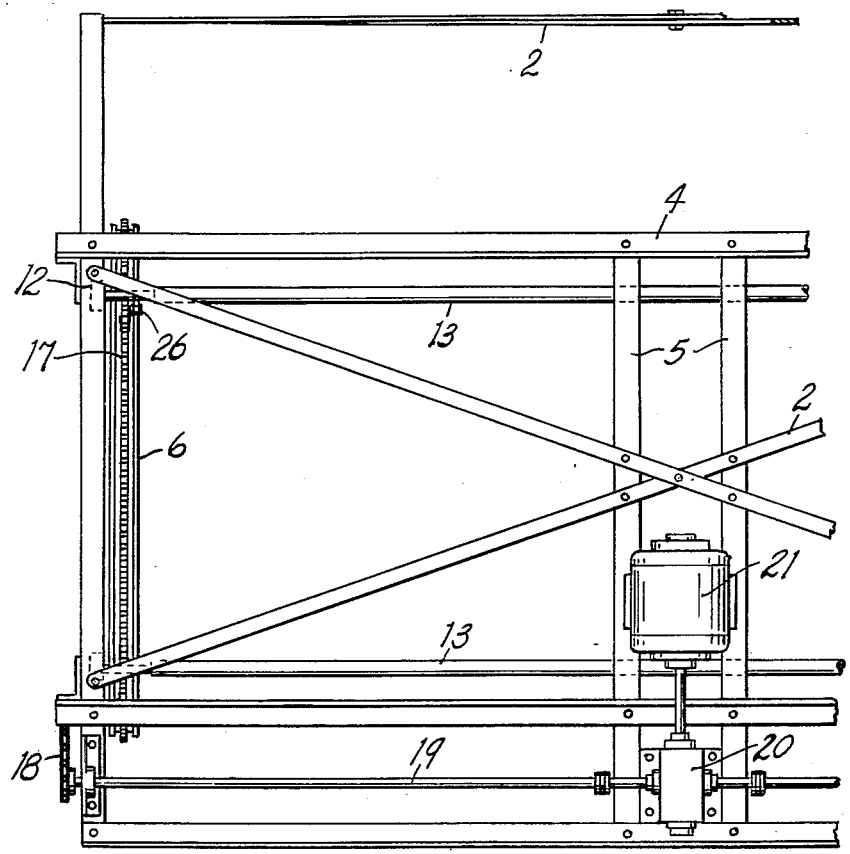
Fig. 3 is a fragmentary top plan view of the apparatus.
Figure 8:
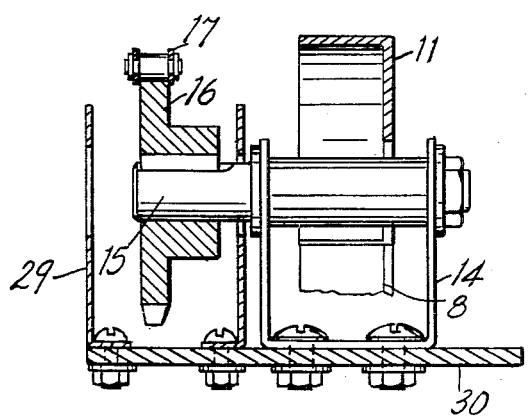
Fig. 8 is an enlarged fragmentary cross sectional view taken along the plane of the line 8—8 in Fig. 5.

As in these prior patents, the object of the present invention is to provide increased storage space for various articles by utilizing the space commonly wasted above ordinary cabinet height while still making the stored articles readily accessible at floor level by providing means for advancing the articles from storage position to floor level access or display position. The articles stored or displayed may take a variety of forms and may include shelves or bins for small articles, or files, or the articles may consist of garments suspended from individual hangers. As is best illustrated in Figs. 1, 2 and 3, the apparatus consists of a supporting structure having spaced rectangular end members 1 interbraced by cross braces 2. The end members include upright columns 3 and top cross bars 4. Transverse support bars 5 at the top of the frame work support driving mechanism as will be described. The structure may be enclosed in a suitable cabinet or left exposed according to the desire of the user, so no enclosing panels are illustrated.

Each end member 1 supports a conveyor support and guide frame of generally rectangular shape and indicated in its entirety by the reference numeral 6. The frames 6 are supported in spaced parallel relation and are identical in construction and operation, so only one support frame will be described.

As is best illustrated in Fig. 4 the support and guide frame 6 consists of an upright front rail 7 and an upright rear rail 8 secured to the columns 3 by suitable clips or brackets 9. The lower ends of the rails 7 and 8 abut against the upwardly curved end portions 49 of a lower horizontal rail 10. The upper ends of the upright rails terminate in outwardly spaced relationship to an upper horizontal rail 11. The rails are of angled cross section having laterally turned flanges projecting inwardly of the frame work to support and guide rollers 12 on the ends of article support rods 13 that extend between the two support and guide frames. Three support rods are illustrated, but two rods could be utilized. It is not desirable to have more than three support rods, as this creates interference between groups of supported articles as they are moved between stored and displayed positions.

At each corner of the support frame 6 there is provided a U-shaped bracket 14 supporting the shaft 15 of the sprocket 16.

The sprockets are thus positioned at the corners of the support frame 6 and have a chain loop 17 trained therearound. One of the sprocket shafts 15, such as the upper front shaft 15A, projects outwardly from the frame work to engage the drive chain 18. The sprocket shaft 15 and the chain loops 17 at each end of the mechanism are simultaneously and equally driven by a cross shaft 19 from a reduction gear 20. The reduction gear is driven by a motor 21 mounted on the cross bars 5 at the top of the frame work.

The chain loop 17 is spaced inwardly from the guide frame 6 and in order to successively advance the support rods 13 along the guide frame, the chain is provided with leading pawls 22 and trailing pawls 23 that project outwardly from the chain loops to engage the support rods as will be described.

The pawls 22 and 23 are mounted in closely spaced pairs at diametrically opposed points on the chain loop. The leading pawls 22 consist of U-shaped members having their leading ends pivotally secured to the chain 17 by pivot pins 24. The trailing pawls 23 are similarly U-shaped and have their leading ends secured to the chain loop by pivots 25. The leading pawls 22 are supported in outwardly projecting load engaging position relative to the chain loop by follower rolls 26 secured to the trailing end of the lead pawl. It will be noted with reference to Fig. 4 that the follower roll 26 on the upper lead pawl is disposed on the outer side of the chain loop, whereas the follower roll 26A on the lower lead pawl is disposed on the inner side of the chain loop. The trailing pawls 23 are similarly urged to upwardly projecting rod engaging position by follower rolls 27 mounted on the trailing ends of the follower pawls. In each pair of pawls 22 and 23 the follower rolls 26 and 27 are disposed on opposite sides of the chain loop which necessarily requires that the follower roll 27 of the upper pair shown in Fig. 4 shall be on the inner side, while the follower roll of the trailing pawl of the lower pair will be on the outer side of the chain and invisible in Fig. 4.

The follower rolls 26 and 27 are supported by engagement with cam plates 28 extending along the inside of the chain loop. At the corners of the guide frame the cam plates 28 are connected by channel shaped brackets 29 having deepened cross section to permit the formation of a recessed cam notch 31 in one side of the bracket. The several brackets 29 may be identical in construction but are mounted in reversed positions on the supporting clips 30 so that the notches 31 in the upper rear and lower front corners, as shown in Fig. 4, are on the inner side of the chain loop while the notches 31A at the upper front and lower rear are at the outer side of the chain loop. The edges of the brackets 29 opposite the notches 31 are continuous extensions of the edges of the cam plates 28. Desirably a support rail 32 extends along the center of the cam plates 28 to support the inside of the chain loop 17.

The corner brackets 29 are secured in place by attachment to the previously described angle clips 30 and by clips 33 (see Figs. 5 and 9) which connect the corner brackets to the cam plates 28.

Locating stops 34 for the support rods 13 are located on the front and back ends of the support rails 10 and 11. The stops apply a restraining force to the support rods as they are moved along the support rails to locate the support rods in predetermined positions and to cause the follower rolls 26 and 27 to move into the cam notches 31.

In the example illustrated, the stop members 34 constitute angled clips secured to the support rails and have upstanding flanges with inclined edges 35 designed to engage the support rods 13 and lift the support rods and their supporting rolls 12 out of engagement with the support rails 10 and 11.

A force necessary to lift the support rods along the inclined surfaces 35 is sufficient to tilt the pawls on their pivots if the follower roll of the pawl is in registry with one of the cam notches 31 or 31A. Concave seats 36 on the stop members restrain the support rods in predetermined positions until engaged by a pawl that can not retract away from the support rods. The leading pawls 22 have rearwardly inclined leading edges 37 that coact with the support rods in camming the pawls into the notches 31 and 31A. The trailing pawls 23 desirably have forwardly inclined leading edges 38 to act as hook supports for the support rods 13 in moving the support rods upwardly along the rear guide rail 8 and the trailing edges of the lead pawls 22 desirably having rearwardly inclined trailing edges 39 to similarly act as hook supports for lowering the support rods along the forward guide rail 6 (see Fig. 10).

With the foregoing structure in mind the operation of the storage and display mechanism is best illustrated in Figs. 11 to 22. In order to distinguish between the several article support rods and the pairs of rod advancing pawls, these elements are given letter designations. Starting with a support rod 13A at the upper rear corner of the guide frame and a support rod 13B at the upper front corner of the frame, the third support rod 13C will be at the lower front corner of the guide frame where articles supported thereon will be displayed at floor level in the manner shown in Fig. 2 where garments G are conventionally illustrated as hanging on hangers from the support rod. The trailing pawl 23A is engaged behind the rod 13A but inoperative to advance the rod because the follower roll associated with that pawl is in registry with the inner cam plate to retract into the notch 31. The trailing pawl 23B at the bottom of the guide frame is in engagement with the lower rod 13C and its follower roll is in engagement with the outer cam plate which is continuous at this point so that advancing motion of the chain loop 17 moves the support rod 13C rearwardly to the position shown in Fig. 12.

The lead pawl 22A moves forwardly and its follower roll being engaged with the outer cam plate retracts into the cam notch 31A to pass under the support rod 13B to assume the position shown in Fig. 12. The trailing pawl 23A is supported in outwardly projected position by the inner cam plate to force the support rod 13B off of its seat and on to the leading pawl 22A as that pawl descends along the front guide rail 7. The second phase movement of the trailing pawl 23B retracts the pawl into cam notch 31A at the lower rear corner of the guide frame so that the pawl 23B passes the rod 13C leaving it substantially to the rear of the frame.

The chain loops then advance to the position shown in Fig. 13 wherein the leading pawl 22B and its follower roll 26 retract into the cam notch 31 to pass under the support rod 13A. The trailing pawl 23B is supported in outwardly projected position by the continuous outer cam plate and is ready to advance the rod 13A. The trailing pawl 23A and its follower roll retract into the lower cam notch 31 and pass the support rod 13B leaving it supported in display position in the space just vacated by the rod 13C.

The next phase of operation advances the top support rod 13A to the front of the guide frame after which the trailing pawl 23B and its follower roll retract into the upper notch 31A to leave the support rod in its forward position. The leading pawl 22A advances underneath the support rod 13C by retracting into the lower cam notch 31A and the trailing pawl 23A is in position to advance the rod 13C.

The next phase moves the rod 13c to the upper rear corner of the guide frame where the trailing pawl 23A deposits the support rod on its stop and retracts into the upper cam notch 31. The leading pawl 22B retracts into the lower cam notch 31 and passes under the support rod 13B so that the trailing pawl 23B comes into position to advance the rod 13B, as shown in Fig. 15.

In the next phase of operation the trailing pawl 23B moves the rod 13B rearwardly to the position shown in Fig. 16 and then retracts into the lower cam notch 31A. The leading pawl 22A advances under the support rod 13A by retracting into the upper notch 31A and locates the trailing pawl 23A in position to push the rod 13A off of its locating stop.

In the next phase of operation the pawls 22A and 23A advance the support rod 13A to display position, as shown in Fig. 17, while the pawls 22B and 23B advance to the upper rear corner of the guide frame where they are in position to advance the rod 13C.

The next phase of operation advances the rod 13C to the position shown in Fig. 18 and advances the pawls 22A and 23A into driving engagement with the rod 13B.

The next operation advances the rod 13B to the upper rear corner of the guide frame and advances the pawl 23B into driving engagement with the rod 13A, as shown in Fig. 19.

The rods 13A, 13B and 13C have thus been advanced until the rod 13B occupies the position originally occupied by rod 13A. Rod 13A occupies the position originally occupied by rod 13C, and rod 13C occupies the position originally occupied by rod 13B and the support rods in Fig. 19 are in the same position relative to the guide frame 6 as they are in Fig. 11. The mechanism will then repeat the cycle of operations to further advance the support rods to the successive positions illustrated in Figs. 20, 21 and 22.

It will be noted that the arrangement of cam notches and cam followers on the rod advancing pawls results in the movement of the support rods so that a rod always moves into a vacant space so that there will be no interference between the articles on the moving rod and the other articles on a stationary rod even though the article may hang a considerable distance below the support rods. Thus suits or long coats suspended from the support rods, as in Fig. 2, will not interfere with each other in advancing successive groups of garments from storage to display position. The succession or order of movement of the support rods is automatically determined and no attention on the part of the operator is required. Correct functioning of the mechanism does not depend upon proper operation of any spring latches or catches and the location of the several support rods on their associated stops automatically actuates the pivotally supported pawls in the desired sequence, as determined by the relative positions of the cam notches 31A and 31B and the follower rolls 26 and 27.

It is believed that the disclosure of the embodiment of the invention just described will permit others to adapt and use the invention with such variations and modifications thereof as may appear desirable. The disclosed embodiment of the invention is intended as an example only and the invention is defined in the claims.

Having thus described the invention, what is claimed to be new and what it is desired to secure by Letters Patent is:

1. In a storage and display rack having spaced upright end members, support and guide frames supported in spaced parallel relation on said end members and spaced substantially above the bottoms thereof, each frame having parallel upper and lower rails and upright front and rear rails connected at their bottoms to the ends of said lower rails by curved connection portions, three support rods extending between said frames and having rollers on their ends arranged to roll on said upper and lower rails and move vertically along said upright rails, sprockets mounted at the corners of said frames, means for simultaneously rotating a sprocket on each frame, chain loops trained around the sprockets on each frame with their upper reaches below the upper rails, rod locating seats at the front and back of said upper and lower rails and projecting thereabove, said seats having inclined edges engageable with said rods to lift said rods and the rollers out of supporting engagement with said rails, two pairs of rod advancing pawls mounted at equally spaced points on said loops and projecting outwardly therefrom, said pawls having pivotal connections to the chains at their leading ends, a follower roll on the trailing end of each lead pawl of said pairs projecting to the sides of said chains, the follower rolls of the lead pawls on each chain projecting to the opposite sides of the chain, a follower roll on the trailing end of each trailing pawl, the follower rolls of each pair of pawls being on opposite sides of the chain, cam plates extending along both sides of said upper and lower rails and engaging said follower rolls and supporting said pawls in outwardly projecting rod engaging position from said chain loops, inwardly recessed notches at two opposite corners of the inner of said cam plates adapted to permit the follower rolls and pawls engaged with said inner cam plates to move inwardly out of rod engaging position while passing the seats at said corners, the outer cam plates having continuous edges opposite said notches to support the follower rolls engaged therewith in outwardly projected rod engaging position, and other inwardly recessed notches at the other opposite corners of the outer cam plates adapted to permit the follower rolls and pawls engaged therewith to swing inwardly out of rod engaging position at the seats at said other opposite corners, the inner cam plates having continuous edges to support the follower rolls and pawls engaged therewith in outwardly projected rod engaging position at said other opposite corners, the notched portions of said cam plates being formed in identical stampings reversely mounted in said cam plates, said leading pawls having outwardly and rearwardly inclined leading and trailing edges to respectively urge the pawls inwardly when striking said rods and support the rods along the downwardly moving reach of the chain loops, said trailing pawls having outwardly and forwardly inclined leading edges to support said rods on the upwardly moving reaches of the loops, said upright rails engaging the rollers on said rods to hold the rods in supported engagement with said pawls along said upright rails.

2. In a storage and display rack having spaced upright end members, support and guide frames supported in spaced parallel relation on said end members, each frame having parallel upper and lower rails and upright front and rear rails connected at their bottoms to the end of said lower rails, three support rods extending between said frames and having rollers on their ends arranged to roll on said upper and lower rails and move vertically along said upright rails, sprockets mounted at the corners of said frames, means for simultaneously rotating a sprocket on each frame, chain loops trained around the sprockets on each frame, rod locating seats at the front and back of said upper and lower rails and projecting thereabove, said seats having inclined edges engageable with said rods to lift said rods and the rollers out of supporting engagement with said rails, two pairs of rod advancing pawls mounted at equally spaced points on said loops and projecting outwardly therefrom, said pawls having pivotal connections to the chains at their leading ends, a follower roll on the trailing end of each lead pawl of said pairs, the two follower rolls on each chain projecting to opposite sides of their associated chain, other follower rolls on the trailing ends of the trailing pawls, the follower rolls of each pair of pawls being on opposite sides of the chain, cam plates extending along both sides of said upper and lower rails and engaging said follower rolls and supporting said pawls in outwardly projecting rod engaging position from said chain loops, inwardly recessed notches at two opposite corners of the inner of said cam plates adapted to permit the follower rolls and pawls engaged with said inner cam plates to move inwardly out of rod engaging position while passing the seats at said corners, the outer cam plates having continuous edges opposite said notches to support the follower rolls engaged therewith in outwardly projected rod engaging position, and other inwardly recessed notches at the other opposite corners of the outer cam plates adapted to permit the follower rolls and pawls engaged therewith to swing inwardly out of rod engaging position at the seats at said other opposite corners, the inner cam plate having continuous edges to support the follower rolls and pawls engaged therewith in outwardly projected rod engaging position at said other opposite corners, said leading pawls having outwardly and rearwardly inclined leading and trailing edges adapted to respectively urge the pawls inwardly when striking said rods and support the rods along the downwardly moving reach of the chain loops, said trailing pawls having outwardly and forwardly inclined leading edges to support said rods on the upwardly moving reaches of the loops.

3. In a storage and display rack having spaced upright end members, support and guide frames supported in spaced parallel relation on said end members, each frame having parallel upper and lower rails and upright front and rear rails connected at their bottoms to the end of said lower rails, three support rods extending between said frames and having rollers on their ends arranged to roll on said upper and lower rails and move vertically along said upright rails, sprockets mounted at the corners of said frames, means for simultaneously rotating a sprocket on each frame, chain loops trained around the sprockets on each frame, rod locating seats at the front and back of said upper and lower rails and projecting thereabove, said seats having inclined edges engageable with said rods to lift said rods and the rollers out of supporting engagement with said rails, two pairs of rod advancing pawls mounted at equally spaced points on said loops and projecting outwardly therefrom, said pawls having pivotal connections to the chains at their leading ends, a follower roll on the trailing end of each lead pawl of said pairs, the two follower rolls on each chain projecting to opposite sides of their associated chain, other follower rolls on the trailing ends of the trailing pawls, the follower rolls of each pair of pawls being on opposite sides of the chain, cam plates extending along both sides of said upper and lower rails and engaging said follower rolls and supporting said pawls in outwardly projecting rod engaging position from said chain loops, inwardly recessed notches at two opposite corners of the inner of said cam plates adapted to permit the follower rolls and pawls engaged with said inner cam plates to move inwardly out of rod engaging position while passing the seats at said corners, the outer cam plates having continuous edges opposite said notches to support the follower rolls engaged therewith in outwardly projected rod engaging position, and other inwardly recessed notches at the other opposite corners of the outer cam plates adapted to permit the follower rolls and pawls engaged therewith to swing inwardly out of rod engaging position at the seats at said other opposite corners, the inner cam plate having continuous edges to support the follower rolls and pawls engaged therewith in outwardly projected rod engaging position at said other opposite corners, said leading pawls having leading and trailing edges adapted to respectively urge the pawls inwardly when striking said rods and support the rods along the downwardly moving reach of the chain loops, said trailing pawls having leading edges to support said rods on the upwardly moving reaches of the loops.

4. In a storage and display rack having spaced upright end members, support and guide frames supported in spaced parallel relation on said end members, each frame having upper and lower rails and upright front and rear rails connected at their bottoms to the end of said lower rails, three support rods extending between said frames and having their ends arranged to be supported on said upper and lower rails and move vertically along said upright rails, sprockets mounted at the corners of said frames, means for simultaneously rotating a sprocket on each frame, chain loops trained around the sprockets on each frame, rod locating seats at the front and back of said upper and lower rails and projecting thereabove, said seats having inclined edges engageable with said rods to lift said rods out of supporting engagement with said rails, two pairs of rod advancing pawls mounted at equally spaced points on said loops and projecting outwardly therefrom, said pawls having pivotal connections to the chains at their leading ends, a follower on the trailing end of each lead pawl of said pairs, the two followers on each chain projecting to opposite sides of their associated chain, other followers on the trailing ends of the trailing pawls, the followers of each pair of pawls being on opposite sides of the chain, cam plates extending along both sides of said upper and lower rails and engaging said followers and supporting said pawls in outwardly projecting rod engaging position from said chain loops, inwardly recessed notches at two opposite corners of the inner of said cam plates adapted to permit the followers and pawls engaged with said inner cam plates to move inwardly out of rod engaging position while passing the seats at said corners, the outer cam plates having continuous edges opposite said notches to support the followers engaged therewith in outwardly projected rod engaging position, and other inwardly recessed notches at the other opposite corners of the outer cam plates adapted to permit the followers and pawls engaged therewith to swing inwardly out of rod engaging position at the seats at said other opposite corners, the inner cam plate having continuous edges to support the followers and pawls engaged therewith in outwardly projected rod engaging position at said other opposite corners, said leading pawls having outwardly and rearwardly inclined leading and trailing edges adapted to respectively urge the pawls inwardly when striking said rods and support the rods along the downwardly moving reach of the chain loops, said trailing pawls having outwardly and forwardly inclined leading edges to support said rods on the upwardly moving reaches of the loops.

5. In a storage and display rack having spaced upright end members, support and guide frames supported in spaced parallel relation on said end members, each frame having upper and lower rails and upright front and rear rails connected at their bottoms to the end of said lower rails, three support rods extending between said frames and having their ends arranged to be supported on said upper and lower rails and move vertically along said upright rails, sprockets mounted at the corners of said frames, means for simultaneously rotating a sprocket on each frame, chain loops trained around the sprockets on each frame, rod locating seats at the front and back of said upper and lower rails and projecting thereabove, said seats having inclined edges engageable with said rods to lift said rods out of supporting engagement with said rails, two pairs of rod advancing pawls mounted at equally spaced points on said loops and projecting outwardly therefrom, said pawls having pivotal connections to the chains at their leading ends, a follower on the trailing end of each lead pawl of said pairs, the two followers on each chain projecting to opposite sides of their associated chain, other followers on the trailing ends of the trailing pawls, the followers of each pair of pawls being on opposite sides of the chain, cam plates extending along both sides of said upper and lower rails and engaging said followers and supporting said pawls in outwardly projecting rod engaging position from said chain loops, inwardly recessed notches at two opposite corners of the inner of said cam plates adapted to permit the followers and pawls engaged with said inner cam plates to move inwardly out of rod engaging position while passing the seats at said corners, the outer cam plates having continuous edges opposite said notches to support the followers engaged therewith in outwardly projected rod engaging position, and other inwardly recessed notches at the other opposite corners of the outer cam plates adapted to permit the followers and pawls engaged therewith to swing inwardly out of rod engaging position at the seats at said other opposite corners, the inner cam plate having continuous edges to support the followers and pawls engaged therewith in outwardly projected rod engaging position at said other opposite corners, said leading pawls having leading and trailing edges adapted to respectively urge the pawls inwardly when striking said rods and support the rods along the downwardly moving reach of the chain loops, said trailing pawls having inclined leading edges to support said rods on the upwardly moving reaches of the loops.

6. In a storage and display rack having spaced upright end members, support and guide frames supported in spaced relation on said end members, each frame having upper and lower rails and upright front and rear rails connected at their bottoms to the end of said lower rails, three support rods extending between said frames and having their ends arranged to be supported on said upper and lower rails and move vertically along said upright rails, sprockets mounted at the corners of said frames, means for simultaneously rotating a sprocket on each frame, chain loops trained around the sprockets on each frame, rod locating stops at the front and back of said upper and lower rails arranged to resist horizontal movement of said rods at the stops, two pairs of rod advancing pawls mounted at equally spaced points on said loops and projecting outwardly therefrom, said pawls having pivotal connections to the chains at their leading ends, a follower on the trailing end of each lead pawl of said pairs, the two followers on each chain projecting to opposite sides of their associated chain, other followers on the trailing ends of the trailing pawls, the followers of each pair of pawls being on opposite sides of the chain, cam plates extending along both sides of said upper and lower rails and engaging said followers, and supporting said pawls in outwardly projecting rod engaging position from said chain loops, inwardly recessed notches at two opposite corners of the inner of said cam plates adapted to permit the followers and pawls engaged with said inner cam plates to move inwardly out of rod engaging position while passing the stops at said corners, the outer cam plates having continuous edges opposite said notches to support the followers engaged therewith in outwardly projected rod engaging position, and other inwardly recessed notches at the other opposite corners of the outer cam plates adapted to permit the followers and pawls engaged therewith to swing inwardly out of rod engaging position at the stops at said other opposite corners, the inner cam plates having continuous edges to support the followers and pawls engaged therewith in outwardly projected rod engaging position at said other opposite corners, said leading pawls having outwardly and rearwardly inclined leading and trailing edges to respectively urge the pawls inwardly when striking said rods and support the rods along the downwardly moving reach of the chain loops, said trailing pawls having outwardly and forwardly inclined leading edges to support said rods on the upwardly moving reaches of the loops.

7. In a storage and display rack having spaced upright end members, support and guide frames supported in spaced relation on said end members, each frame having upper and lower rails and upright front and rear rails connected at their bottoms to the end of said lower rails, three support rods extending between said frames and having their ends arranged to be supported on said upper and lower rails and move vertically along said upright rails, sprockets mounted at the corners of said frames, means for simultaneously rotating a sprocket on each frame, chain loops trained around the sprockets on each frame, rod locating stops at the front and back of said upper and lower rails arranged to resist horizontal movement of said rods at the stops, two pairs of rod advancing pawls mounted at equally spaced points on said loops and projecting therefrom, said pawls having pivotal connections to the chains at their leading ends, a follower on the trailing end of each lead pawl of said pairs, the two followers on each chain projecting to opposite sides of their associated chain, other followers on the trailing ends of the trailing pawls, the followers of each pair of pawls being on opposite sides of the chain, cam plates extending along both sides of said upper and lower rails and engaging said followers and supporting said pawls in projecting rod engaging position from said chain loops, recessed notches at two opposite corners of the inner of said cam plates adapted to permit the followers and pawls engaged with said inner cam plates to move out of rod engaging position while passing the stops at said corners, the outer cam plates having continuous edges opposite said notches to support the followers engaged therewith in projected rod engaging position, and other recessed notches at the other opposite corners of the outer cam plates adapted to permit the followers and pawls engaged therewith to swing out of rod engaging position at the stops at said other opposite corners, the inner cam plates having continuous edges to support the followers and pawls engaged therewith in projected rod engaging position at said other opposite corners, said leading pawls having leading and trailing edges to respectively urge the pawls to retracted position when striking said rods and support the rods along the downwardly moving reach of the chain loops, said trailing pawls having leading edges to support said rods on the upwardly moving reaches of the loops.

8. In a storage and display rack having spaced upright end members, support and guide frames supported in spaced relation on said end members, each frame having upper and lower rails, three support rods extending between said frames and having their ends arranged to be supported on said upper and lower rails and move vertically between the ends of said rails, sprockets mounted at the corners of said frames, means for simultaneously rotating a sprocket on each frame, chain loops trained around the sprockets on each frame, rod locating stops at the front and back of said upper and lower rails arranged to restrain horizontal movement of said rods at said stops, two pairs of rod advancing pawls mounted at diametrically opposite points on said loops and projecting therefrom, said pawls having pivotal connections to the chains at their leading ends, followers on the trailing end of each lead pawl of said pairs, the two followers on each chain projecting to opposite sides of their associated chain, other followers on the trailing ends of the trailing pawls, the follows of each pair of pawls being on opposite sides of the chain, cam plates extending along both sides of said upper and lower rails and engaging said followers and supporting said pawls in projecting rod engaging position from said chain loops, recessed notches at two opposite corners of the inner of said cam plates adapted to permit the followers and pawls engaged with said inner cam plates to move out of rod engaging position while passing the stops at said corners, the outer cam plates having continuous edges opposite said notches to support the followers engaged therewith in projected rod engaging position, and other recessed notches at the other opposite corners of the outer cam plates adapted to permit the followers and pawls engaged therewith to swing out of rod engaging position at the stops at said other opposite corners, the inner cam plate having continuous edges to support the followers and pawls engaged therewith in projected rod engaging position at said other opposite corners, said leading pawls having leading and trailing edges to respectively urge the pawls to retracted position when striking said rods and support the rods along the downwardly moving reach of the chain loops, said trailing pawls having leading edges to support said rods on the upwardly moving reaches of the loops.

9. In a storage and display rack having spaced upright end members, support and guide frames supported in spaced relation on said end members, each frame having upper and lower rails, three support rods extending between said frames and having their ends arranged to be supported on said upper and lower rails and move vertically between the ends of said rails, sprockets mounted at the corners of said frames, means for simultaneously rotating a sprocket on each frame, chain loops trained around the sprockets on each frame, rod locating stops at the front and back of said upper and lower rails arranged to restrain horizontal movement of said rods at said stops, two pairs of rod advancing pawls mounted at diametrically opposite points on said loops and projecting therefrom, said pawls having pivotal connections to the chains at their ends, followers on the other end of each lead pawl of said pairs, the two followers on each chain projecting to opposite sides of their associated chain, other followers on the ends of the trailing pawls, the followers of each pair of pawls being on opposite sides of the chain, cam plates extending along both sides of said upper and lower rails and engaging said followers and supporting said pawls in projecting rod engaging position from said chain loops, recessed notches at two opposite corners of the inner of said cam plates adapted to permit the followers and pawls engaged with said inner cam plates to move out of rod engaging position while passing the stops at said corners, the outer cam plates having continuous edges opposite said notches to support the followers engaged therewith in projected rod engaging position, and other recessed notches at the other opposite corners of the outer cam plates adapted to permit the followers and pawls engaged therewith to swing out of rod engaging position at the stops at said other opposite corners, the inner cam plate having continuous edges to support the followers and pawls engaged therewith in projected rod engaging position at said other opposite corners.

10. In a storage and display rack having spaced upright end members, support and guide frames supported in spaced parallel relation on said end members and spaced substantially above the bottoms thereof, each frame having parallel upper and lower rails, three support rods extending between said frames and having rollers on their ends arranged to roll on said upper and lower rails and move vertically between the ends of said rails, sprockets mounted at the corners of said frames, means for simultaneously rotating a sprocket on each frame, chain loops trained around the sprockets on each frame with their upper reaches below the upper rails, rod locating stops at the front and back of said upper and lower rails, said stops being arranged to restrain movement of said rods along said rails, two pairs of rod advancing pawls mounted at diametrically spaced points on said loops and projecting therefrom, said pawls having pivotal connections to the chains at one end, a follower roll on the other end of each lead pawl of said pairs projecting to the sides of said chains, the follower rolls of the lead pawls on each chain projecting to the opposite sides of the chain, a follower roll on the other end of each trailing pawl, the follower rolls of each pair of pawls being on opposite sides of the chain, cam plates extending along both sides of said upper and lower rails and engaging said follower rolls and supporting said pawls in projecting rod engaging position from said chain loops, recessed notches at two opposite corners of the inner of said cam plates adapted to permit the follower rolls and pawls engaged with said inner cam plates to move out of rod engaging position while passing the stops at said corners, the outer cam plates having continuous edges opposite said notches to support the follower rolls engaged therewith in projected rod engaging position, and other recessed notches at the other opposite corners of the outer cam plates adapted to permit the follower rolls and pawls engaged therewith to swing out of rod engaging position at the stops at said other opposite corners, the inner cam plate having continuous edges to support the follower rolls and pawls engaged therewith in projected rod engaging position at said other opposite corners, said leading pawls having leading and trailing edges to respectively urge the pawls to retracted position when striking said rods and support the rods along the downwardly moving reach of the chain loops, said trailing pawls having leading edges to support said rods on the upwardly moving reaches of the loops.

11. In an article storage and display device, a pair of conveyors arranged in spaced vertically extending closed loops, means for advancing said conveyors simultaneously, three article supports extending transversely between said conveyors at spaced points therearound, two pairs of spaced support advancing pawls pivotally mounted on each conveyor at diametrically opposite points on each conveyor, means to support said article supports and restrain movement thereof at quadrilaterally arranged positions along said conveyors pairs of cam plates extending along said conveyors, one cam plate of each pair having recessed notches therein opposite one diametrically opposed pair of said support means and extending continuously past the other pairs of said support means, the other cam plates of each pair having recessed notches therein opposite the other diametrically opposed pairs of support means and extending continuously past the first pairs of support means, and followers on said pawls engaged with said cam plates, the followers of each pair of pawls being engaged with different plates of a pair of cam plates, the leading pawls of the two pairs of pawls having their followers engaged with different plates of said pairs of cam plates, the continuous portions of said cam plates holding the followers and pawls engaged therewith in projecting article support engaging and advancing position, the recessed portions of said cam plates permitting retraction of the followers and the pawls engaged therewith out of article support engaging and advancing position.

12. In an article storage and display device, a conveyor arranged in vertically extending closed loop, means for advancing said conveyor, three article supports extending transversely of said conveyor at spaced points therearound, two pairs of spaced support advancing pawls pivotally mounted on said conveyor at diametrically opposite points, means to support said article supports and restrain movement thereof at quadrilaterally arranged positions along said conveyor, a pair of cam plates extending along said conveyor, one cam plate having offset portions thereon opposite one diametrically opposed pair of said support means and extending continuously past the other pair of said support means, the other cam plate having offset portions thereon opposite the other diametrically opposed pair of support means and extending continuously past the first pair of support means, and followers on said pawls engaged with said cam plates, the followers of each pair of pawls being engaged with different plates of the pair of cam plates, the leading pawls of the two pairs of pawls having their followers engaged with different plates of said pair of cam plates, the continuous portions of said cam plates holding the followers and pawls engaged therewith in projecting article support engaging and advancing position, the offset portions of said cam plates permitting retraction of the followers and the pawls engaged therewith out of article support engaging and advancing position.

13. In an article storage and display device, a pair of spaced conveyor loops having upper and lower reaches connected at their ends by upright reaches, two pairs of pawls mounted at symmetrically opposite points on each conveyor with each pawl pivoted at one end to its associated conveyor, followers on the other ends of said pawls to control the movement of the pawls about their pivots, the followers of the two pawls of each pair of pawls lying in different positions with respect to their associated conveyor, the positions of the followers of the pairs of pawls on each chain being reversed, spaced support means extending along each conveyor and engaged with the followers thereon to support the pawls in projecting relationship to the conveyors, three article carrying bars extending between said conveyors in the path of said pawls to be selectively moved around said conveyors by the pawls, cam means at two diagonally opposite corners of each of said support means opposite the front and rear ends of said upper and lower reaches adapted to permit movement of followers engaged with the cam means to retract the pawls from bar engaging position, the cam means on one of the support means of each pair of support means being located at the opposite corners from the cam means of the other support means of the pair, holding means located opposite each of said cam means to support the ends of said bars and restrain the bars against horizontal movement, and means for simultaneously advancing said conveyors.

References Cited in the file of this patent

UNITED STATES PATENTS 2,659,647    Lyon _____ Nov. 17, 1953